United States Patent [19]
Enders et al.

[11] Patent Number: 5,763,027
[45] Date of Patent: Jun. 9, 1998

[54] INSENSITIVE MUNITIONS COMPOSITE PRESSURE VESSELS

[75] Inventors: Mark L. Enders, North Ogden; Tony T. Robinson, Corinne, both of Utah

[73] Assignee: Thiokol Corporation, Ogden, Utah

[21] Appl. No.: 268,810

[22] Filed: Jun. 30, 1994

[51] Int. Cl.$^6$ ............... B65D 90/56; F02K 9/34
[52] U.S. Cl. ............ 428/34.7; 428/35.8; 428/36.1; 428/36.3; 428/36.4; 428/902; 428/34.5; 220/414; 220/417; 220/457; 220/590
[58] Field of Search ............ 428/34.4, 34.5, 428/34.6, 34.7, 36.3, 36.4, 902, 35.8, 36.1, 35.9; 60/253, 255; 220/415, 586, 588, 589, 590, 454, 417, 414, 457; 206/6

[56] References Cited

U.S. PATENT DOCUMENTS

| | | | |
|---|---|---|---|
| 3,296,802 | 1/1967 | Williams | 60/256 |
| 3,303,079 | 2/1967 | Carter | 156/172 |
| 3,655,085 | 4/1972 | Aleck | 220/590 |
| 3,669,302 | 6/1972 | Markarian | 220/44 R |
| 3,970,208 | 7/1976 | Raes | 220/3 |
| 3,973,397 | 8/1976 | Chase et al. | 60/253 |
| 4,492,779 | 1/1985 | Junior et al. | 523/138 |
| 4,600,732 | 7/1986 | Junior et al. | 523/138 |
| 4,624,885 | 11/1986 | Mumford et al. | 428/222 |
| 4,690,295 | 9/1987 | Wills | 220/207 |
| 4,838,166 | 6/1989 | Spies et al. | 102/481 |
| 4,846,911 | 7/1989 | Tackett et al. | 156/173 |
| 4,881,998 | 11/1989 | Youngkeit | 156/173 |
| 4,911,795 | 3/1990 | Olliff, Jr. | 204/4 |
| 4,927,038 | 5/1990 | Roebuck | 220/3 |
| 4,938,824 | 7/1990 | Youngkeit | 156/173 |
| 4,956,971 | 9/1990 | Smith | 60/245 |
| 5,021,270 | 6/1991 | Black, Jr. et al. | 428/34.1 |
| 5,032,016 | 7/1991 | Youngkeit | 350/613 |
| 5,044,154 | 9/1991 | English, Jr. et al. | 60/223 |
| 5,060,470 | 10/1991 | VanName | 60/253 |
| 5,071,506 | 12/1991 | Nelson et al. | 156/441 |
| 5,127,399 | 7/1992 | Scholley | 128/205.22 |
| 5,166,468 | 11/1992 | Atkeson | 102/207 |
| 5,206,989 | 5/1993 | Smith et al. | 29/890.01 |
| 5,228,285 | 7/1993 | Van Name et al. | 60/253 |
| 5,273,312 | 12/1993 | Coultas et al. | 280/737 |
| 5,279,321 | 1/1994 | Krimm | 137/68.1 |
| 5,280,706 | 1/1994 | Yorgason | 60/255 |
| 5,433,474 | 7/1995 | Materna et al. | 280/736 |

OTHER PUBLICATIONS

"Spectra High Performance Fibers" product catalog.

*Primary Examiner*—Rena Dye
*Attorney, Agent, or Firm*—Cushman Darby & Cushman IP Group of Pillsbury Madison & Sutro, LLP; Ronald L. Lyons, Esq.

[57] ABSTRACT

An insensitive composite pressure vessel for containing an energetic compound includes at least two fibers having different temperature resistance characteristics. A dynamic fiber loses a substantial portion of its tensile strength at a transformation temperature which is preferably substantially less than the combustion temperature of the energetic compound, whereas a stable fiber retains substantially all of its tensile strength at temperatures exceeding the transformation temperature. Hence, a pressure vessel formed of dynamic fibers and stable fibers has sufficient burst strength to resist operating pressures under normal conditions. The vessel loses strength and develops additional orifices to vent combustion products from the energetic compound in the event of an external fire, thereby allowing unintentionally ignited rocket motors to burn substantially in place. The present invention also discloses methods for making such vessels by shaping, impregnating, and consolidating fibers and resins, and methods for venting combustion products from such vessels in an actual or simulated external fire.

26 Claims, 2 Drawing Sheets

INSENSITIVE MUNITIONS COMPOSITE PRESSURE VESSELS

BACKGROUND

1. The Field of the Invention

The present invention is related to pressure vessels which allow fluids to vent at pressures lower than a normal operating pressure in the event of an external fire, and more particularly to insensitive pressure vessels constructed with fibers that have different temperature resistance properties.

2. Technical Background

Conventional composite pressure vessels are constructed by securing reinforcing fibers in a resin matrix. Such composite construction provides vessels which are both lightweight and strong. Accordingly, composite vessels are used in a wide variety of applications to contain fluids under pressure. As used herein, "fluid" includes both gases and liquids.

Some of the materials contained in pressure vessels are dangerous if heated improperly. For instance, certain rocket motors include a conventional composite pressure vessel which contains an energetic propellant. When the propellant is heated to a combustion temperature it begins rapidly generating gases. Properly harnessed, these gases safely propel the rocket and make the rocket useful in a variety of commercial, scientific, and military settings.

However, if the propellant ignites at the wrong time or place, such as during a fire on board ship or in a burning manufacturing facility, the propelled rocket may cause extensive injury. Once a solid fuel propellant ignites, it is extremely difficult to extinguish. Therefore, the rocket will likely be driven by the propellant through bulkheads, walls, surrounding munitions and chemicals, fire-fighting equipment, and anything else it encounters.

In addition to the resulting structural damage, the burning rocket will likely cause extensive heat damage. Rocket motor exhaust temperatures typically exceed 500° C. (over 900° F.). Moreover, the moving rocket motor may encounter and ignite materials that the fire would not otherwise have reached.

Most seriously, the hurtling rocket threatens fire fighters, military personnel, workers, and bystanders. Any of these people may be seriously injured or killed by impact with the rocket, by the combustion heat, by combustion fumes, or by fires and explosions initiated by the rocket motor exhaust. As long as propellant remains and continues to combust in an unrestrained and intact pressure chamber, lives and property are at risk.

Hazards also exist in other applications of composite pressure vessels. For instance, compressed natural gas (CNG) is stored in and drawn from conventional composite pressure vessels to fuel a variety of vehicles. However, if the CNG is over-heated, such as in a burning vehicle or warehouse, conventional vessels may explode. The heated contents build up enormous pressure inside the vessel until the vessel suddenly bursts. The force of the explosive shock wave, the resulting heat, and the flying shrapnel produced all pose serious risks to anyone nearby.

The problem therefore exists of how to continue receiving the substantial benefits of composite pressure vessel use while reducing the hazards created when such vessels and their contents are inadvertently overheated. One approach is to make the pressure vessel fail due to excessive external heat. That is, the pressure vessel is constructed such that the heat of a fire outside the vessel causes the vessel to lose strength. Such vessels are termed "insensitive" because they are less susceptible to external fires than conventional vessels.

An insensitive pressure vessel has reduced resistance to the pressures imposed by the overheated propellant, CNG, or other contained material. Instead of containing the pressurized fluid, the insensitive vessel allows the fluid to leak or vent through openings newly created in the vessel in response to the fire.

Venting typically reduces the hazards posed by overheated vessel contents. In a fire, for instance, an unintentionally ignited rocket motor having a fire-sensitive case vents combustion gases through the nozzle alone. By contrast, an insensitive rocket motor vessel vents not only through the nozzle but also through new holes in the case. The insensitive motor therefore burns substantially in place rather than hurtling about causing widespread damage and injury.

In a similar manner, the vents in an insensitive container which holds CNG or another potentially explosive material prevent the pressure buildup that leads to the explosion. Vents are created in response to the fire, so the overheated material escapes from the container at substantially lower pressure than with a conventional fire-sensitive container.

One approach to forming insensitive pressure vessels includes cutting numerous slots or orifices in a metal tube. A thermoplastic composite material is positioned inside the metal tube, and an insulating liner is placed inside the thermoplastic composite. A layer of propellant positioned inside the liner substantially defines a pressure chamber. The liner, the thermoplastic composite, and the tube in combination have sufficient structural strength to resist the normal operating pressures within the pressure chamber when the propellant combusts. The liner thermally insulates the thermoplastic composite from the pressure chamber so that normal combustion of the propellant leaves the thermoplastic composite intact.

However, the thermoplastic composite is not substantially insulated from the ambient environment outside the vessel. Thus, in an external fire the thermoplastic composite melts and the vessel is structurally weakened. The weakened vessel is unable to resist the combustion pressure created when the propellant is heated by the external fire to its combustion temperature. The pressurized combustion products therefore vent through the slots in the metal tube, and the rocket motor burns substantially in place rather than hurtling about.

An alternative approach is to filament wind a meltable fiber such as polyethylene around the exterior of the slotted metal tube. The liner, the tube, and the fiber are configured to provide sufficient strength in combination to resist normal operating pressures. In an external fire, however, the polyethylene melts. The pressure of the propellant combustion products then overcomes the liner and the tube, and the combustion products vent through the slots.

Although such uses of a slotted metal tube create insensitive vessels, use of a tube has several drawbacks. The slots in the tube are typically created with an expensive laser machining process which adds significantly to the vessel's cost. In addition, attaching the tube to the thermoplastic composite or to the liner requires at least one manufacturing step beyond those required for fiber winding alone. The metal tube also adds significantly to the weight of the vessel. Weight increases cause increased handling costs for any vessel, and increases in vessel weight also decrease the effective range of rocket motors constructed with the heavier vessels.

From the foregoing, it can be seen that it would be an advancement in the art to provide an insensitive composite pressure vessel which is constructed without a metal shell.

It would also be an advancement in the art to provide a method for constructing such a pressure vessel without machining orifices into a metal shell.

Such a method and device are disclosed and claimed herein.

BRIEF SUMMARY OF THE INVENTION

The present invention is directed to insensitive pressure vessels, and to the construction and use of such vessels. A preferred embodiment of an insensitive pressure vessel according to the present invention is a hybrid composite vessel suitable for containing an energetic compound such as rocket motor propellant or compressed fluid.

The pressure vessel has an "operating" burst strength at a low external temperature and has a weaker "venting" burst strength at a higher external temperature. That is, the heat of a fire outside the vessel causes the vessel to lose strength. The operating burst strength exists at an external ambient temperature in the range from about $-10°$ C. to about $65°$ C. (about $-50°$ F. to about $150°$ F.). At an external ambient temperature which is greater than about $65°$ C. (about $150°$ F.), the vessel weakens to the venting burst strength. The venting burst strength is no greater than approximately 80 percent of the operating burst strength. Different embodiments of the vessel weaken to less than 80 percent of their operating burst strength, weaken at external temperatures higher than $65°$ C., or do both.

The vessel comprises a consolidated, resin-impregnated, fibrous composite material. The composite includes a resin, stable fibers, and dynamic fibers. The stable fibers retain substantially all of their tensile strength at external temperatures not greater than the internal combustion temperature. By contrast, the dynamic fibers have a transformation temperature between about $65°$ C. (about $150°$ F.) and the internal combustion temperature at which they lose a substantial portion of their tensile strength. The stable fibers and the dynamic fibers are each impregnated with the resin and are positioned adjacent one another in the composite.

The preferred embodiment of the vessel is a fiber-wound composite structure having at least two adjacent fiber bundles positioned in one layer. One of the fiber bundles is substantially free of dynamic fibers and the other fiber bundle is substantially free of stable fibers. Thus, fiber bundles of dynamic fibers and fiber bundles of stable fibers are positioned side-by-side within a given layer. An alternative embodiment includes at least two adjacent layers, one of which is substantially free of dynamic fibers and the other of which is substantially free of stable fibers.

Suitable stable fibers for use in a vessel according to the present invention include, without limitation, carbon, graphite, aramid, glass, silicon carbide, boron, alumina, fused silica, metallic, and alumina-boria-silica fibers. Suitable dynamic fibers include, without limitation, hemp, jute, flax, cotton, silk, nylon, acetate-based compounds, acrylonitrile-based compounds, fluorocarbons, polyester, polyethylene, polypropylene, rayon, urethane, and polyolefins. Suitable resins include thermoplastic and thermoset resins.

The present invention also provides a method of forming an insensitive pressure vessel. The vessel formed is suitable to receive an energetic compound having a combustion temperature at which the energetic compound combusts and creates a combustion pressure within the vessel.

The presently preferred method of forming the vessel includes selecting a dynamic fiber having a transformation temperature at which it loses a substantial portion of its tensile strength. A stable fiber is also selected. The stable fiber is capable of retaining substantially all of its tensile strength if heated above the transformation temperature of the dynamic fiber.

The transformation temperature is preferably substantially less than the combustion temperature of the energetic compound. Vessels may be formed with a dynamic fiber whose transformation temperature is at least a certain amount below the combustion temperature, such as at least about $50°$ C. below the combustion temperature (about $90°$ F. below the combustion temperature). Vessels may also be formed with a dynamic fiber whose transformation temperature is no higher than the melting temperature of polyethylene, of polypropylene, or of another selected material.

The method further includes impregnating, shaping, and consolidating steps. These steps form a vessel having sufficient strength to withstand the combustion pressure created by combustion of the energetic compound if the dynamic fiber is kept below its transformation temperature. The formed vessel does not have sufficient strength to withstand the combustion pressure if the dynamic fiber is above its transformation temperature.

The impregnating step includes impregnating dynamic fibers and stable fibers with a thermoplastic or thermoset resin. The dynamic fibers and stable fibers are preferably each impregnated with the same resin. However, multiple resins may also be employed. For instance, one type of fiber may be impregnated with a thermoset resin while the other type is impregnated with a thermoplastic resin. Alternatively, one layer containing both types of fiber may be impregnated with a first resin while an adjacent layer is impregnated with a second, different resin. Of course, each resin may itself be a mixture of multiple compounds and materials.

The shaping step includes shaping the dynamic fibers, the stable fibers, and the resin into a resin-impregnated fibrous composite having the shape of the vessel. The shape formed may be that of a rocket motor case, for instance, or of a CNG container. The shaping is preferably accomplished by fiber winding the dynamic fibers and the stable fibers in adjacent fiber bundles which are applied simultaneously about a mandrel. Alternatively, layers of dynamic fiber may be interleaved with layers of stable fiber during fiber winding. Other shaping techniques such as braiding, filament winding, fiber placement, hand taping, tape rolling, resin transfer molding, and the like may also be employed.

The consolidating step includes rigidifying the resin of the resin-impregnated fibrous composite. In multilayer composites, consolidation also includes binding multiple layers together. Consolidation generally occurs after the shaping step, but thermoplastic resin composites can be simultaneously shaped and consolidated.

It is presently preferred that the dynamic fibers and stable fibers be impregnated with a heated thermoplastic resin, and that the consolidating step include allowing the thermoplastic resin to cool. Alternatively, the dynamic fibers and stable fibers may be impregnated with a thermoset resin having a cure temperature less than the transformation temperature of the dynamic fibers. In this case the consolidating step includes heating the thermoset resin to its cure temperature to cause chemical cross-linking and polymerization which rigidify the resin.

The present invention also provides a method for venting combustion products. The first step of a presently preferred method includes obtaining a pressure vessel containing an energetic compound. Combustion of the energetic compound within the pressure vessel at an initial ambient temperature is calculated to produce a combustion pressure within the pressure vessel.

The pressure vessel obtained is a composite hybrid pressure vessel, such as a rocket motor case, which includes a dynamic composite and a stable composite. The dynamic composite includes resin-impregnated dynamic fibers which lose a substantial portion of their tensile strength if heated to a transformation temperature which is substantially less than the combustion temperature of the energetic compound. The stable composite includes resin-impregnated stable fibers which retain substantially all of their tensile strength if heated to the transformation temperature.

At the initial ambient temperature, which is less than the combustion temperature of the energetic compound, the pressure vessel has a burst strength sufficient to withstand the calculated combustion pressure. That is, the pressure vessel with-stands the expected operating pressure if no external fire threatens the vessel.

The pressure vessel also has a set of initial orifices at the initial ambient temperature. The term "initial orifices" is used to distinguish orifices that are normally present from orifices that are created in response to an external fire. A rocket motor case, for instance, typically includes a nozzle throat as an initial orifice. Likewise, a CNG container typically includes an initial orifice for supplying CNG from the container to the vehicle's engine. An initial orifice may be closed, as with pressurized fluid containers stored in a warehouse.

The method includes the additional step of raising the ambient temperature outside the pressure vessel until the raised ambient temperature exceeds the transformation temperature of the dynamic composite. The ambient temperature is preferably raised in a controlled manner that approximates the presence of a fire in the environment wherein the vessel is used.

In addition, the venting method includes initiating combustion of the energetic compound. In an undesired external fire combustion may be initiated by the rise in ambient temperature caused by the fire. In testing situations, combustion may be initiated by the controlled rise in ambient temperature or by an independently actuated ignition device.

The method also includes maintaining the ambient temperature above the transformation temperature for a sufficient time to cause transformation of the dynamic composite. Transformation gives the pressure vessel a burst strength less than the burst strength required to withstand the calculated combustion pressure.

Finally, the method includes creating at least one additional orifice in the pressure vessel through which combustion products of the energetic compound may vent. For instance, the dynamic fibers may melt and thereby create spaces through which combustion products of the energetic compound may vent. Alternatively, the weakened vessel may simply burst open in response to pressure from the combustion products of the energetic compound. These additional orifices release pressure from inside the vessel and hence reduce the hazards created by storing energetic compounds in such vessels.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to insensitive pressure vessels, and to the construction and use of such vessels. A preferred embodiment of an insensitive pressure vessel according to the present invention is indicated generally at 10 in FIG. 1. The vessel 10 is a hybrid composite vessel suitable for containing an energetic compound such as rocket motor propellant 12. Alternative embodiments of pressure vessels according to the present invention are suitable for containing other energetic compounds, such as compressed fluid.

Each energetic compound has a combustion temperature at which it will combust. As used herein, "combustion" includes any process which may substantially increase the pressure within a vessel in response to increased heat acting upon the contents of the vessel. Thus combustion includes, without limitation, the processes of burning, of generating a gas, and of exploding.

Figure 1:
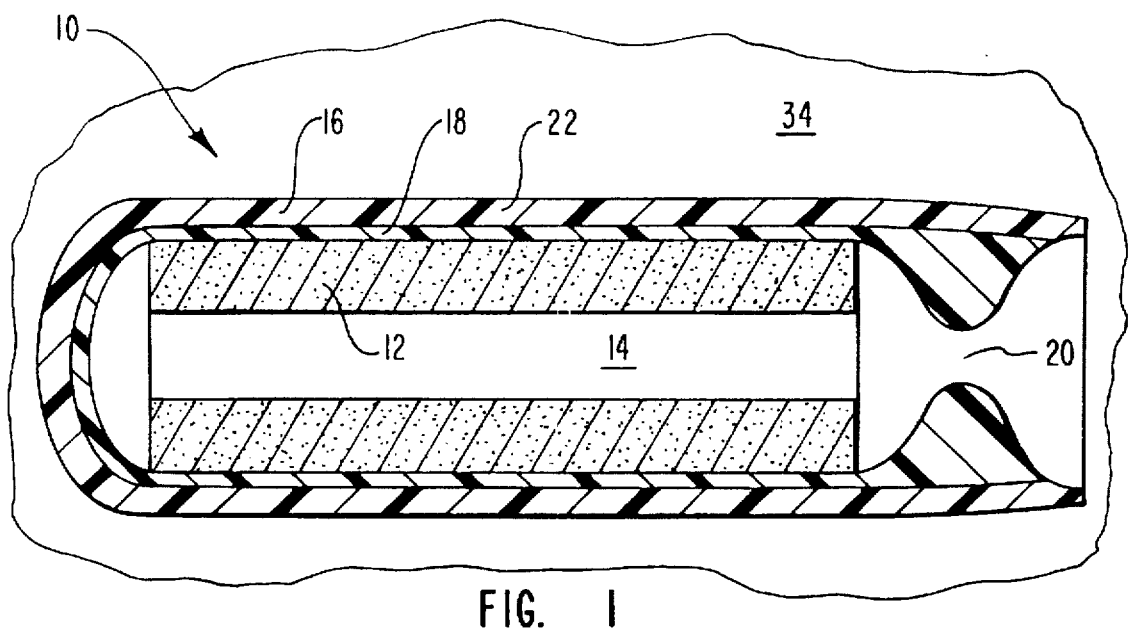
FIG. 1 is a cross-sectional view of a portion of a rocket motor embodying an insensitive vessel according to the present invention, including a case which comprises a composite formed from fibers having different temperature resistances.

With reference to FIG. 1, the rocket motor propellant 12 is an energetic compound because it may respond to a temperature increase by generating gases that increase the pressure in a combustion chamber 14. Other examples of energetic compounds include, without limitation, compressed fluid such as CNG, flammable chemicals, and gas generants such as those used in air bag inflators.

The pressure vessel 10 comprises a case 16 which is separated from the propellant 12 by a liner 18. The vessel is configured with a nozzle throat 20 that provides fluid communication between the combustion chamber 14 and the external environment 34. Thus configured, the case 16 and the liner 18 in combination provide the vessel 10 with a certain burst strength. The burst strength of a vessel is the pressure differential between the vessel's interior and exterior at which the vessel fails. The vessel may fail by developing cracks, by becoming more porous, by shattering apart, by bursting open, or in any other manner that decreases the pressure differential between the vessel's interior and exterior.

The pressure vessel 10 has an "operating" burst strength at a low external temperature and has a weaker "venting" burst strength at a higher external temperature. That is, the heat of a fire (not shown) outside the vessel 10 causes the vessel 10 to lose a portion of its ability to resist pressure differentials. The operating burst strength exists at an ambient external temperature in the range from about −10° C. to about 65° C. (about −50° F. to about 150° F.). The vessel 10 weakens to the venting burst strength, which is no greater than approximately 80 percent of the operating burst strength, at an ambient external temperature which is greater than about 65° C. (about 150° F.).

Figure 2:
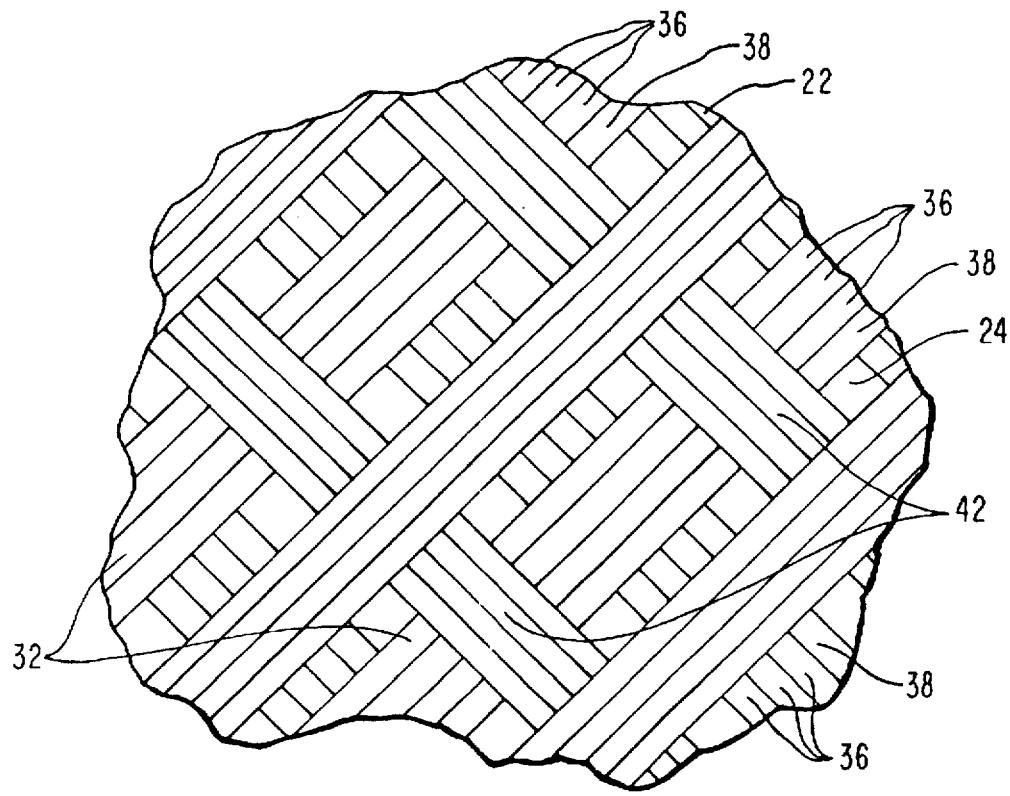
FIG. 2 is an enlarged surface view of a portion of the case shown in FIG. 1 illustrating a preferred configuration of the composite prior to raising the ambient temperature.

The vessel 10 comprises a consolidated, resin-impregnated, fibrous composite 22. As illustrated in FIG. 2, the composite 22 includes a resin 24, stable fibers, and dynamic fibers. The stable fibers and the dynamic fibers are positioned in bundles 36 and 38, respectively, and placed adjacent one another in the composite 22. The resin 24 is preferably evenly distributed about the fibers. Suitable resins include both thermoplastic and thermoset resins.

As shown in FIG. 2, the preferred embodiment of the composite 22 is a fiber-wound composite structure having four adjacent fiber bundles 36, 38 positioned in one layer 32. Fiber bundles such as tows, rovings, filaments, sheets, and tapes are known to those of skill in the art. It will be appreciated that the number of dynamic fiber bundles 38 and the number of stable fiber bundles 36 may vary in other embodiments, and that the spatial relationship of the bundles 36 and 38 may also vary.

The fiber bundles 36 are substantially free of dynamic fibers and the fiber bundle 38 is substantially free of stable fibers. Thus, a fiber bundle 38 of dynamic fibers and a fiber bundle 36 of stable fibers are positioned side-by-side within the layer 32.

Figure 3:
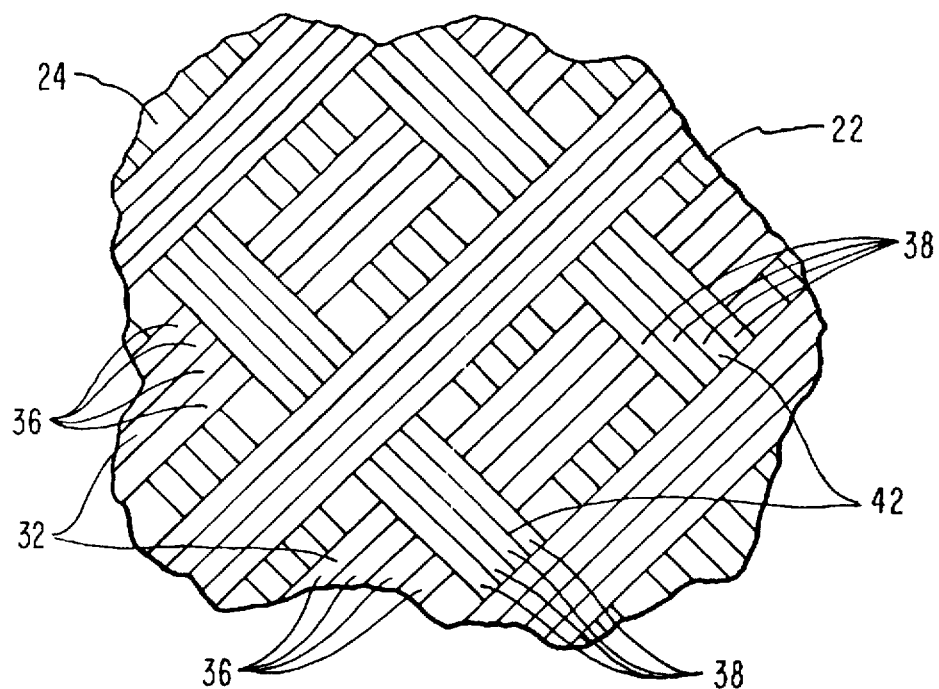
FIG. 3 is an enlarged surface view of a portion of the case shown in FIG. 1 illustrating an alternative configuration of the composite prior to raising the ambient temperature.

An alternative embodiment of the composite 22 is illustrated in FIG. 3. This alternative embodiment includes at least two adjacent layers 32 and 42 of fiber bundles. The first layer 32 contains stable fiber bundles 36 whereas the other layer 42 contains dynamic fiber bundles 38. The first layer 32 is substantially free of dynamic fibers and the other layer 42 is substantially free of stable fibers.

With reference to FIGS. 2 and 3, the stable fibers retain substantially all of their tensile strength at external temperatures greater than the combustion temperature of the energetic compound contained by the vessel 10 (FIG. 1). Suitable stable fibers for use in a vessel according to the present invention include, without limitation, carbon, graphite, aramid, glass, silicon carbide, boron, alumina, fused silica, metallic, and alumina-boria-silica fibers.

By contrast, the dynamic fibers have a transformation temperature between about 65° C. (about 150° F.) and the combustion temperature at which they lose a substantial portion of their tensile strength. Suitable dynamic fibers include, without limitation, hemp, jute, flax, cotton, silk, nylon, acetate-based compounds, acrylonitrile-based compounds, fluorocarbons, polyester, polyethylene, polypropylene, rayon, urethane, and polyolefins.

The transformation temperature of the dynamic fibers is preferably substantially less than the combustion temperature of the energetic compound, so that transformation occurs and the vessel loses burst strength well before the energetic compound begins combusting. However, embodiments are also contemplated in which combustion begins, the internal vessel pressure increases as a result, transformation then occurs, and the vessel finally vents. Even though combustion begins before such a vessel weakens significantly, the danger posed by the overheated energetic compound is reduced because such a vessel nonetheless vents sooner than would a conventional fire-sensitive vessel.

Different embodiments of the vessel weaken to less than 80 percent of their operating burst strength, weaken at temperatures higher than 65° C., or do both. According to the teachings herein, those of skill in the art may control the burst strengths of embodiments of the present invention, and the temperatures at which those burst strengths are attained, by using different materials and by configuring those materials in different ways.

The present invention also provides a method of forming an insensitive pressure vessel such as the vessel 10 in FIG. 1 or another pressure vessel such as a compressed fluid container. A presently preferred method for forming a rocket motor case such as the vessel 10 shown in FIG. 1 is described below, but those of skill in the art will appreciate that a variety of other pressure vessel embodiments may also be formed according to the teachings herein.

The vessel 10 is suitable to receive the energetic compound 12. As noted, the energetic compound 12 is a propellant having a combustion temperature at which it combusts and creates a combustion pressure within the vessel 10. With reference to FIGS. 1 through 3, the presently preferred method of forming the vessel 10 includes selecting the dynamic fiber. The dynamic fiber has a transformation temperature at which it loses a substantial portion of its tensile strength. Suitable dynamic fibers include those previously described, as well as other fibers known to those of skill in the art.

According to the method, the stable fiber is also selected. The stable fiber is capable of retaining substantially all of its tensile strength if heated above the transformation temperature of the dynamic fiber. Suitable stable fibers include those previously described, as well as other fibers known to those of skill in the art.

The vessel 10 may be formed with a dynamic fiber whose transformation temperature is at least a certain amount below the combustion temperature of the energetic compound 12. For instance, the dynamic fiber may have a transformation temperature at least about 50° C. below the combustion temperature (about 90° F. below the combustion temperature). Thus, a temperature buffer zone can be created to ensure that venting is enabled before any substantial pressure differential exists between the interior 14 and the exterior 34 of the vessel 10.

The method includes forming a composite 22 by impregnating, shaping, and consolidating steps. The impregnating step includes impregnating the dynamic fibers and the stable fibers with the thermoplastic or thermoset resin 24. Impregnation may be accomplished by suitable conventional methods such as wet-winding with a dip tank, spraying or painting application of the resin, hot-melting, solvent-resin impregnating, co-extruding the resin and fiber through an orifice, and resin transfer molding.

The impregnating step may precede the shaping step, as when a fiber bundle is first impregnated and then wrapped about a mandrel (not shown) by fiber winding. Alternatively, impregnation may occur after the fibers and are placed, such as when a resin transfer molding process is used to shape and impregnate the fibers. The time between the impregnating step and the shaping step ranges from no time up to several years, depending on the methods and materials used to form the vessel 10.

The dynamic fibers and the stable fibers are preferably each impregnated with the same resin 24. However, multiple resins may also be employed. For instance, one type of fiber may be impregnated with a thermoset resin while the other type is impregnated with a thermoplastic resin. Thus, the first layer 32 of stable fiber bundles 36 shown in FIG. 3 might be impregnated with a thermoset resin while the second layer 42 of dynamic fiber bundles 38 is impregnated with a thermoplastic resin, or vice versa.

Alternatively, one layer 32 containing both types of fiber, as shown in FIG. 2, may be impregnated with a first resin while an adjacent layer 42 is impregnated with a second, different resin. Or stable fiber bundles 36 might be impregnated with one type of resin while dynamic fiber bundles 38 are impregnated with another type of resin. In addition, each resin 24 may itself be a mixture of multiple compounds and materials.

With reference to FIGS. 1 through 3, the shaping step includes shaping the dynamic fibers, the stable fibers, and the resin 24 into a resin-impregnated fibrous composite having the shape of the vessel 10. The shape formed may be that of a rocket motor case, such as the case 10 illustrated in FIG. 1. Alternatively, the shape may be that of a compressed fluid container, such as a CNG container. The shapes of such fluid containers are known to those of skill in the art and include, without limitation, hollow circular cylinders capped by a dome at each end, and spheres.

The shaping is preferably accomplished by fiber winding the dynamic fibers and the stable fibers in adjacent fiber bundles 38 and 36, respectively, which are applied simultaneously about a mandrel (not shown) to form a composite such as the composite 22 shown in FIG. 2. Alternatively, layers such as the layer 32 of stable fibers may be interleaved with layers such as the layer 42 of dynamic fibers as shown in FIG. 3.

Various fiber winding configurations may be employed with successive layers, including hoop winding and helical winding configurations. Denoting hoop winding by O and helical winding by X, one may for instance employ an XOOXOO pattern, an XXOOXXOO pattern, or another pattern. Fiber winding methods and devices are well known to those of skill in the art. Shaping is not limited to fiber winding. Other shaping techniques such as braiding, filament winding, fiber placement, hand taping, tape rolling, resin transfer molding, and the like may also be employed.

The consolidating step includes rigidifying the resin 24 of the resin-impregnated fibrous composite 22. In multilayer composites, consolidation also includes binding multiple layers together. Consolidation generally occurs after the shaping step, but thermoplastic resin composites can be simultaneously shaped and consolidated.

It is presently preferred that the dynamic fibers and the stable fibers be impregnated with a heated thermoplastic resin 24, and that the consolidating step include allowing the thermoplastic resin 24 to cool. Alternatively, the dynamic fibers and stable fibers may be impregnated with a thermoset resin 24 having a cure temperature less than the transformation temperature of the dynamic fibers. In this case the consolidating step includes heating the thermoset resin 24 to its cure temperature to cause chemical cross-linking and polymerization which rigidify the resin 24.

The present invention also provides a method for venting combustion products. The first step of a presently preferred method includes obtaining a pressure vessel such as the vessel 10 which contains an energetic compound such as the propellant 12 or a compressed fluid. The method will be described with respect to the embodiment illustrated in FIGS. 1, 2, and 4, but those of skill will appreciate that the teachings herein also extend to other embodiments.

Combustion of the energetic compound 12 within the pressure vessel 10 at an initial ambient temperature is calculated to produce a combustion pressure within the pressure vessel 10. At the initial ambient temperature the pressure vessel 10 has a burst strength sufficient to withstand the calculated combustion pressure. That is, the pressure vessel 10 withstands the expected operating pressure if no external fire threatens the vessel 10. The pressure vessel 10 also an initial orifice in the form of the nozzle throat 20.

The method includes raising the ambient temperature outside the pressure vessel 10 until the raised ambient temperature exceeds the transformation temperature of a dynamic composite. The dynamic composite comprises dynamic fiber bundles 38. The vessel 10 also includes a stable composite which comprises stable fiber bundles 36. The ambient temperature is preferably raised in a controlled manner that approximates the presence of a fire in the application environment of the pressure vessel 10. Application environments include vehicles, ships, warehouses, manufacturing and testing facilities, and other environments where vessels containing energetic compounds are used or stored.

In addition, the venting method includes initiating combustion of the energetic compound 12. In an external fire in an application environment, combustion may be initiated by the rise in ambient temperature caused by the fire. In testing situations, combustion may be initiated by the controlled rise in ambient temperature or by an independently actuated ignition device. Appropriate igniters are well known to those of skill in the art.

Figure 4:
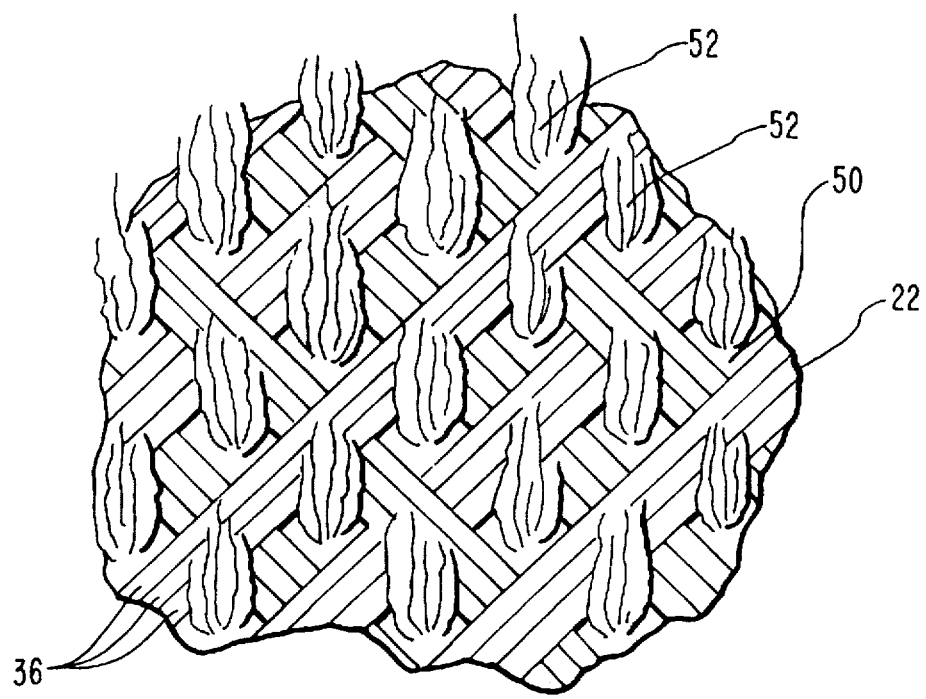
FIG. 4 is a surface view showing the composite configuration of FIG. 2 after the ambient temperature has increased and venting has begun.

The method also includes maintaining the ambient temperature above the transformation temperature for a sufficient time to cause transformation of the dynamic composite. Transformation gives the pressure vessel 10 a burst strength less than the burst strength required to withstand the calculated combustion pressure. Accordingly, as illustrated in FIGS. 1 and 4, at least one additional orifice 50 is created in the pressure vessel 10 through which combustion products 52 of the energetic compound 12 may vent.

Additional orifices may be created in various ways. The composite 22 may become more porous in response to the increased temperature. Alternatively, the dynamic fibers may melt and thereby create spaces 50 through which combustion products 52 of the energetic compound 12 vent. A third possibility is that the weakened vessel 10 may burst open in response to pressure from the combustion products 52 inside the vessel's interior 14.

However created, the additional orifices 50 release pressure from inside the vessel 10 in response to the external fire. Hence, the present invention reduces the hazards created by storing energetic compounds in pressure vessels. Rather than propelling rockets through walls or exploding, pressure vessels according to the present invention burn substantially in place, and vent their combustion products at lower pressures during an external fire than would conventional fire-sensitive vessels. Moreover, the present invention provides insensitive vessels which are constructed without metal tubes and thus avoid the weight and expense of that approach.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A hybrid composite pressure vessel for containing an energetic compound, the energetic compound having a combustion temperature at which the energetic compound will combust, said vessel comprising:

a consolidated, resin-impregnated, fibrous composite, comprising:
a resin;
stable fibers which retain substantially all of their tensile strength at temperatures not greater than the combustion temperature, said stable fibers impregnated with said resin; and
dynamic fibers having a transformation temperature between about 65° C. and the combustion temperature at which they lose a substantial portion of their tensile strength, said dynamic fibers impregnated with said resin and positioned adjacent said stable fibers in said composites,
wherein said pressure vessel has an operating burst strength at an ambient temperature in the range from about −10° C. to about 65° C., and a venting burst strength no greater than approximately 80 percent of said operating burst strength at an ambient temperature which is greater than about 65° C.

2. The vessel of claim 1, wherein said vessel has a venting burst strength no greater than approximately 60 percent of said operating burst strength at an ambient temperature greater than about 65° C.

3. The vessel of claim 1, wherein said vessel has a venting burst strength no greater than approximately 80 percent of said operating burst strength at an ambient temperature greater than about 200° C.

4. The vessel of claim 1, wherein said vessel has a venting burst strength no greater than approximately 60 percent of said operating burst strength at an ambient temperature greater than about 200° C.

5. The vessel of claim 1, wherein said vessel has a venting burst strength no greater than approximately 30 percent of said operating burst strength at an ambient temperature greater than about 200° C.

6. The vessel of claim 1, wherein:
said dynamic fibers are selected from the group consisting of hemp, jute, flax, cotton, silk, nylon, acetate compounds, acrylonitrile compounds, fluorocarbons, polyester, polyethylene, polypropylene, rayon, urethane, and polyolefins; and
said stable fibers are selected from the group consisting of carbon, graphite, aramid, glass, silicon carbide, boron alumina, fused silica, and alumina-boria-silica.

7. The vessel of claim 1, wherein:
said dynamic fibers are selected from the group consisting of hemp, jute, flax, cotton, and silk; and
said stable fibers are selected from the group consisting of carbon, graphite, aramid, glass, silicon carbide, boron, alumina, fused silica, and alumina-boria-silica.

8. The vessel of claim 1, wherein:
said dynamic fibers are selected from the group consisting of hemp, jute, flax, cotton, silk, nylon, acetate compounds, acrylonitrile compounds, fluorocarbons, polyester, polyethylene, polypropylene, rayon, urethane, and polyolefins; and
said stable fibers are selected from the group consisting of silicon carbide, boron, alumina, fused silica, and alumina-boria-silica.

9. The vessel of claim 1, wherein:
said dynamic fibers are selected from the group consisting of nylon, polyethylene, and polypropylene; and
said stable fibers are selected from the group consisting of carbon, graphite, aramid, and glass.

10. The vessel of claim 1, wherein said vessel comprises a thermoplastic resin.

11. The vessel of claim 1, wherein said vessel comprises said dynamic fibers and said stable fibers positioned in at least two layers about a central pressure chamber, one of the layers being substantially free of said dynamic fibers, and the other layer being substantially free of said stable fibers.

12. The vessel of claim 1, wherein said vessel comprises said dynamic fibers and said stable fibers positioned in at least two fiber bundles in one layer about a central pressure chamber, one of the fiber bundles being substantially free of said dynamic fibers, and the other fiber bundle being substantially free of said stable fibers.

13. The vessel of claim 1, wherein said vessel is a fiber-wound composite structure having at least two adjacent layers, said stable fibers and said dynamic fibers being positioned adjacent one another in said layers.

14. The vessel of claim 13, wherein one of said layers is substantially free of dynamic fibers and the other of said layers is substantially free of stable fibers.

15. The vessel of claim 1, wherein said vessel is a fiber-wound composite structure having at least two adjacent fiber bundles positioned in one layer, said stable fibers and said dynamic fibers being positioned adjacent one another in said fiber bundles, one of said fiber bundles being substantially free of dynamic fibers and the other of said fiber bundles being substantially free of stable fibers.

16. The vessel of claim 1, wherein said vessel is a fiber-wound composite structure, and at least one fiber bundle comprising said dynamic fibers is substantially continuous for at least the length of one revolution about said vessel.

17. The vessel of claim 1, wherein said stable fibers are selected from the group consisting of carbon, graphite, aramid, glass, silicon carbide, boron, alumina, fused silica, and alumina-boria-silica.

18. The vessel of claim 1, wherein said stable fibers are metallic.

19. The vessel of claim 1, wherein said dynamic fibers are selected from the group consisting of hemp, jute, flax, cotton, silk, nylon, polyacrylonitrile, fluorocarbons, polyester, polyethylene, polypropylene, rayon, urethane, and polyolefins.

20. The vessel of claim 1, wherein said resin has a melting temperature less than the combustion temperature of the energetic compound.

21. The vessel of claim 1, wherein said vessel is substantially non-metallic.

22. The vessel of claim 1, wherein said transformation temperature is no higher than about 200° C.

23. The vessel of claim 1, wherein said dynamic fibers comprise polyacrylonitrile.

24. The vessel of claim 1, wherein said dynamic fibers comprise a polyolefin.

25. A hybrid composite pressure vessel for containing an energetic compound, the energetic compound having a combustion temperature at which the energetic compound will combust, said vessel comprising:

a consolidated, resin-impregnated, fibrous composite, comprising:
a resin;
stable fibers which retain substantially all of their tensile strength at temperature not greater than the combustion temperature, said stable fibers impregnated with said resin; and dynamic fibers having a transformation temperature between about 65° C. and the combustion temperature at which they lose a substantial portion of their tensile strength, said dynamic fibers impregnated with said resin and positioned adjacent said stable fibers in said composite, wherein said pressure vessel has an operating burst strength at an ambient temperature in the range from about −10° C. to about 65° C., and a venting burst strength no greater than approximately 80 percent of said operating burst strength at an ambient temperature which is greater than about 65° C., wherein said operating burst strength is sufficient to prevent the formation of any non-initial orifices in said composite at the ambient temperature in the range of from about −10° C. to about 65° C., and wherein at least one non-initial orifice is created in said composite through which combustion products contained in said pressure vessel may vent when the ambient temperature outside said pressure vessel is raised above a transformation temperature of about 65° C.

26. A hybrid composite pressure vessel for containing an energetic compound, the energetic compound having a combustion temperature at which the energetic compound will combust, said vessel comprising:

a consolidated, resin-impregnated, fibrous composite, comprising:

a resin;

stable fibers which retain substantially all of their tensile strength at temperature not greater than the combustion temperature, said stable fibers impregnated with said resin; and dynamic fibers having a transformation temperature between about 65° C. and the combustion temperature at which they lose a substantial portion of their tensile strength, said dynamic fibers impregnated with said resin and positioned adjacent said stable fibers in said composite, wherein said stable fibers and said dynamic fibers are constructed and arranged to provide said vessel with a sufficient operating burst strength at an ambient temperature in the range of from about −10° C. to about 65° C. to prevent the formation of any non-initial orifices in said composite, and wherein said stable fibers and said dynamic fibers are constructed and arranged to create at least one non-initial orifice in said composite through which combustion products of the energetic compound may vent when the ambient temperature outside said vessel is raised above the transformation temperature of said dynamic fibers for a sufficient time to cause said dynamic fibers to lose a substantial portion of their tensile strength.

* * * * *